United States Patent  
Tani

(10) Patent No.: US 11,996,079 B2
(45) Date of Patent: May 28, 2024

(54) ACTIVE NOISE REDUCTION DEVICE, VEHICLE, AND ACTIVE NOISE REDUCTION METHOD

(71) Applicant: PANASONIC INTELLECTUAL PROPERTY MANAGEMENT CO., LTD., Osaka (JP)

(72) Inventor: Mitsuhiro Tani, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 124 days.

(21) Appl. No.: 17/745,392

(22) Filed: May 16, 2022

(65) Prior Publication Data
US 2022/0277725 A1    Sep. 1, 2022

Related U.S. Application Data

(63) Continuation of application No. PCT/JP2020/042162, filed on Nov. 11, 2020.

(30) Foreign Application Priority Data

Nov. 19, 2019   (JP) .................................. 2019-208427

(51) Int. Cl.
*G10K 11/178*    (2006.01)

(52) U.S. Cl.
CPC .. *G10K 11/17854* (2018.01); *G10K 11/17823* (2018.01); *G10K 11/17825* (2018.01);
(Continued)

(58) Field of Classification Search
CPC ....... G10K 11/17854; G10K 11/17823; G10K 11/17825; G10K 11/17881;
(Continued)

(56) References Cited

U.S. PATENT DOCUMENTS

2011/0243345 A1* 10/2011 Carreras .......... G10K 11/17854
                                              381/71.6
2015/0063581 A1*  3/2015 Tani ................ G10K 11/17855
                                              381/71.2

FOREIGN PATENT DOCUMENTS

JP    H08-129388 A     5/1996
WO    2014/006846 A1   1/2014

OTHER PUBLICATIONS

Office Action from Japan Patent Office (JPO) in Japanese Patent Appl. No. 2019-208427, dated Aug. 8, 2023, together with an English language translation.

(Continued)

*Primary Examiner* — William A Jerez Lora
(74) *Attorney, Agent, or Firm* — Greenblum & Bernstein, P.L.C.

(57) ABSTRACT

An active noise reduction device reduces noise in a space in an automobile. The active noise reduction device includes: a reference signal input terminal that receives a reference signal outputted by a reference signal source and having a correlation with the noise, the reference signal source being attached to the automobile; a compressor that compresses and outputs the reference signal received by the reference signal input terminal and having an amplitude greater than or equal to a threshold; an adaptive filter unit that applies an adaptive filter to the reference signal outputted from the compressor to generate a canceling signal to be used to output a canceling sound for reducing the noise; and a filter coefficient updater that updates a coefficient of the adaptive filter.

18 Claims, 11 Drawing Sheets

(52) U.S. Cl.
CPC .................. *G10K 11/17881* (2018.01); *G10K 2210/1282* (2013.01); *G10K 2210/3026* (2013.01); *G10K 2210/3027* (2013.01); *G10K 2210/3028* (2013.01); *G10K 2210/3056* (2013.01)

(58) Field of Classification Search
CPC ... G10K 2210/1282; G10K 2210/3026; G10K 2210/3027; G10K 2210/3028; G10K 2210/3056
USPC ..................................... 381/71.1, 71.11, 71.4
See application file for complete search history.

(56) References Cited

OTHER PUBLICATIONS

International Search Report (including English Language Translation), mailed Feb. 2, 2021, by the Japan Patent Office (JPO), for International Application No. PCT/JP2020/042162.

* cited by examiner

ACTIVE NOISE REDUCTION DEVICE, VEHICLE, AND ACTIVE NOISE REDUCTION METHOD

CROSS REFERENCE TO RELATED APPLICATION

This is a continuation application of PCT International Application No. PCT/JP2020/042162 filed on Nov. 11, 2020, designating the United States of America, which is based on and claims priority of Japanese Patent Application No. 2019-208427 filed on Nov. 19, 2019.

FIELD

The present disclosure relates to an active noise reduction device that actively reduces noise by interfering a canceling sound with the noise, a vehicle including the active noise reduction device, and an active noise reduction method.

BACKGROUND

Conventionally, an active noise reduction device has been known that actively reduces noise by outputting a canceling sound for canceling out the noise from a canceling sound source using a reference signal having a correlation with the noise and an error signal that is based on a residual sound resulting from interference between the noise and the canceling sound in a predetermined space (see, for example, Patent Literature (PTL) 1). The active noise reduction device uses an adaptive filter to generate a canceling signal for outputting the canceling sound to minimize the sum of squares of the error signal.

CITATION LIST

Patent Literature

[PTL 1] WO 2014/006846

SUMMARY

The present disclosure provides an active noise reduction device capable of improving upon the above related art.

An active noise reduction device according to one aspect of the present disclosure is an active noise reduction device that reduces noise in a space in a vehicle. The active noise reduction device including: a first reference signal input that receives a first reference signal outputted by a first reference signal source and having a correlation with the noise, the first reference signal source being attached to the vehicle; a first compressor that compresses and outputs the first reference signal received by the first reference signal input and having an amplitude greater than or equal to a first threshold; an adaptive filter unit that applies an adaptive filter to the first reference signal outputted from the first compressor to generate a canceling signal to be used to output a canceling sound for reducing the noise; a canceling signal output that receives the canceling signal generated; a filter coefficient updater that updates a coefficient of the adaptive filter using a step size parameter; and a μ adjuster that adjusts the step size parameter using the first reference signal before being inputted to the first compressor.

An active noise reduction device according to the present disclosure is capable of improving upon the above related art.

BRIEF DESCRIPTION OF DRAWINGS

These and other objects, advantages and features of the present disclosure will become apparent from the following description thereof taken in conjunction with the accompanying drawings that illustrate a specific embodiment of the present disclosure.

DESCRIPTION OF EMBODIMENTS

Hereinafter, embodiments will be specifically described with reference to the drawings. Note that each of the embodiments described below shows a general or specific example. The numerical values, shapes, materials, structural elements, the arrangement and connection of the structural elements, steps, the order of the steps, etc. mentioned in the following embodiments are mere examples and not intended to limit the present disclosure. Of the structural elements in the following embodiments, structural elements not recited in any one of the independent claims representing broadest concepts are described as optional structural elements.

Each diagram is a schematic diagram, and not necessarily a precise illustration. Note that throughout the figures, structural elements that are essentially the same share like reference signs, and duplicate description is omitted or simplified.

Embodiment 1

[Configuration of Automobile Including Active Noise Reduction Device]

Figure 1:
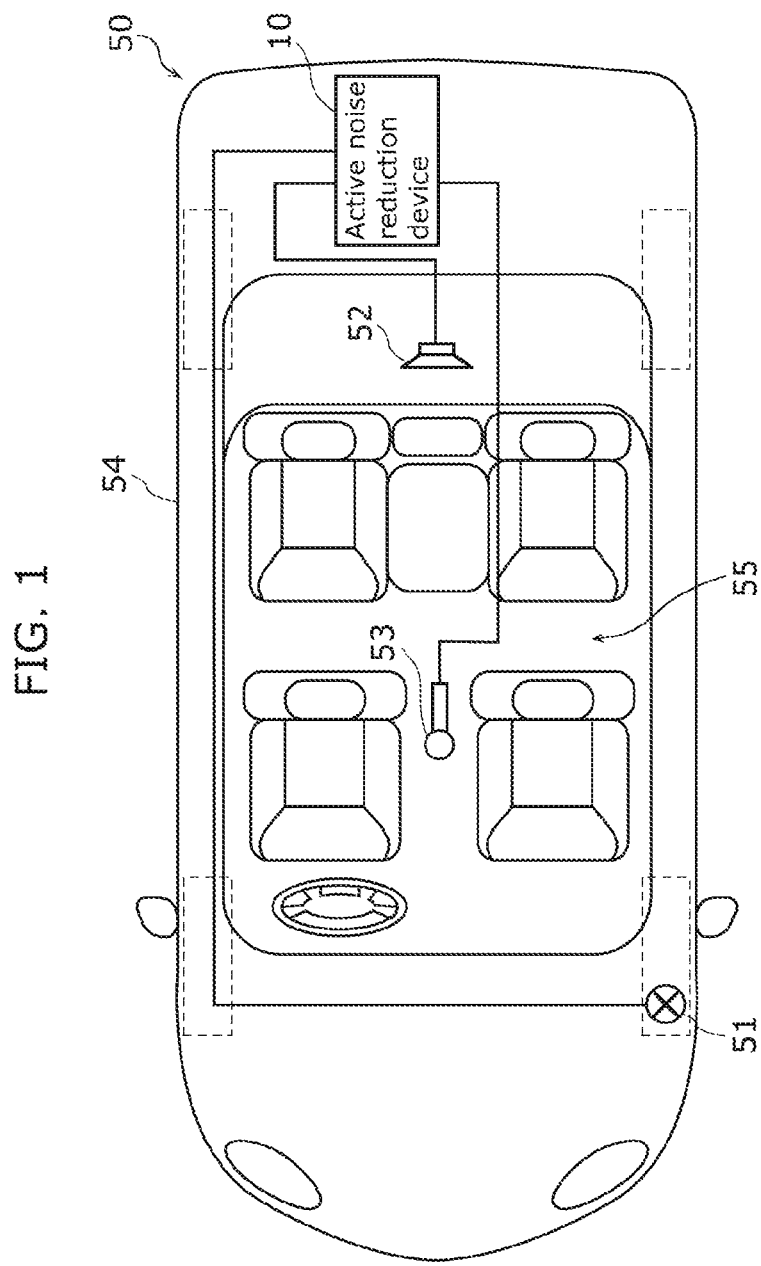
FIG. 1 is a schematic diagram of an automobile including an active noise reduction device according to Embodiment 1 as viewed from above.

Embodiment 1 describes an active noise reduction device mounted on an automobile. FIG. 1 is a schematic diagram of an automobile including an active noise reduction device according to Embodiment 1 as viewed from above.

Automobile 50 is an example of a vehicle. Automobile 50 includes active noise reduction device 10 according to Embodiment 1, reference signal source 51, canceling sound source 52, error signal source 53, and automobile main body 54. Automobile 50 is specifically a passenger car, but is not particularly limited to a passenger car.

Reference signal source 51 is a transducer that outputs a reference signal having a correlation with noise in space 55 in a cabin of automobile 50. In Embodiment 1, reference signal source 51 is an acceleration sensor and is disposed outside space 55. Specifically, reference signal source 51 is attached to a subframe near the left front wheel (or wheel housing of the left front wheel). Note that reference signal source 51 may be attached to any position. Moreover, reference signal source 51 may be a microphone.

Canceling sound source 52 outputs a canceling sound to space 55 using a canceling signal. In Embodiment 1, canceling sound source 52 is a loudspeaker, but a canceling sound may be outputted by vibrating part of the structure of automobile 50 (for example, a sunroof) by a driving mechanism, such as an actuator. In addition, a plurality of canceling sound sources 52 may be used in active noise reduction device 10, and canceling sound sources 52 may be attached to any position.

Error signal source 53 detects a residual sound produced by interference between noise and a canceling sound in space 55 and outputs an error signal based on the residual sound. Error signal source 53 is a transducer, such as a microphone, and is desirable to be disposed in space 55, for example, on a headliner. Note that automobile 50 may include a plurality of error signal sources 53.

Automobile main body 54 is a structure including a chassis, a body, and the like of automobile 50. Automobile main body 54 forms space 55 (the space in the automobile cabin) in which canceling sound source 52 and error signal source 53 are disposed.

[Configuration of Active Noise Reduction Device]

Figure 2:
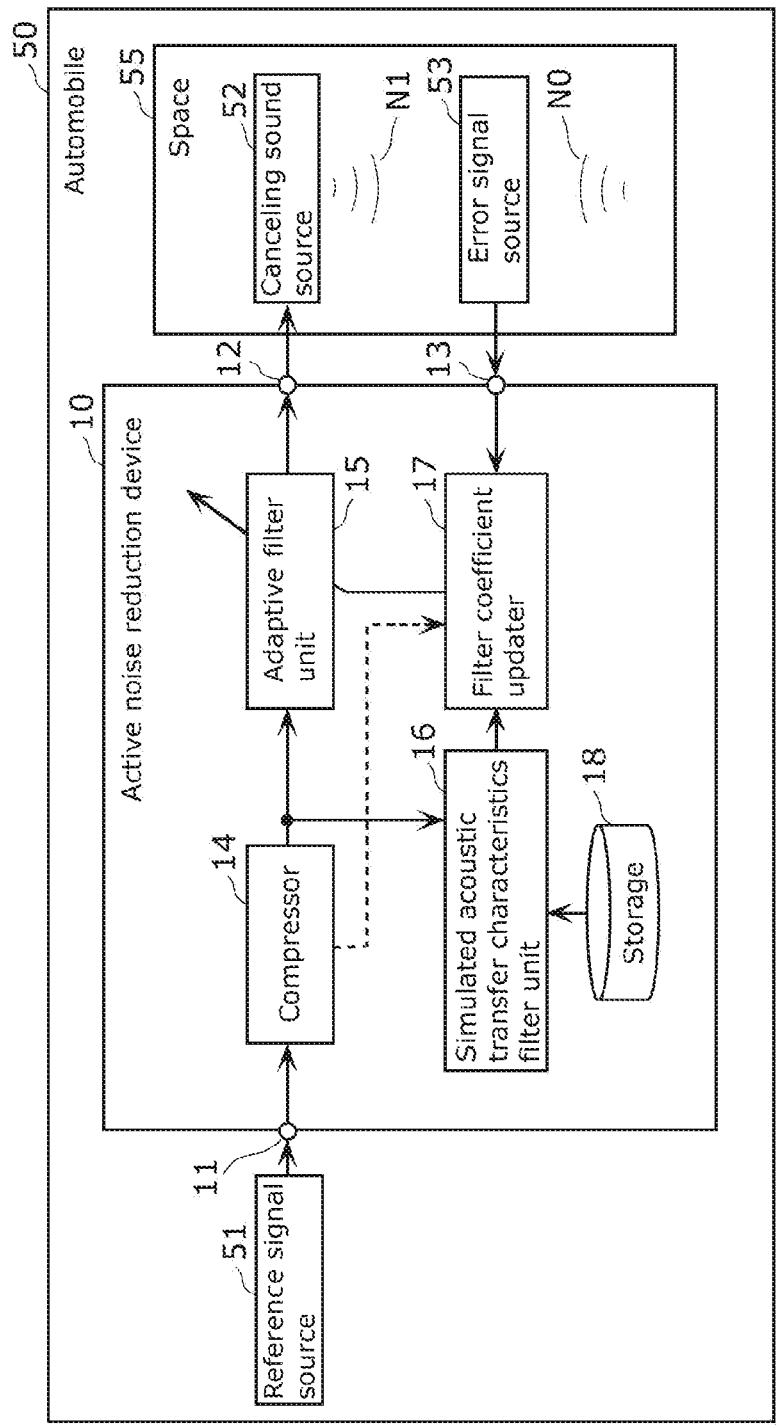
FIG. 2 is a block diagram illustrating a functional configuration of the active noise reduction device according to Embodiment 1.

Next, a configuration of active noise reduction device 10 will be described. FIG. 2 is a block diagram illustrating a functional configuration of active noise reduction device 10.

As illustrated in FIG. 2, active noise reduction device 10 includes: reference signal input terminal 11; canceling signal output terminal 12; error signal input terminal 13; compressor 14; adaptive filter unit 15; simulated acoustic transfer characteristics filter unit 16; filter coefficient updater 17; and storage 18. Compressor 14, adaptive filter unit 15, simulated acoustic transfer characteristics filter unit 16, and filter coefficient updater 17 may be implemented, for example, by executing software by a processor, such as a digital signal processor (DSP) or a microcomputer. Compressor 14, adaptive filter unit 15, simulated acoustic transfer characteristics filter unit 16, and filter coefficient updater 17 may be implemented by hardware, such as circuitry. Moreover, part of compressor 14, adaptive filter unit 15, simulated acoustic transfer characteristics filter unit 16, and filter coefficient updater 17 may be implemented by software and the remaining ones may be implemented by hardware.

[Basic Operation]

Figure 3:
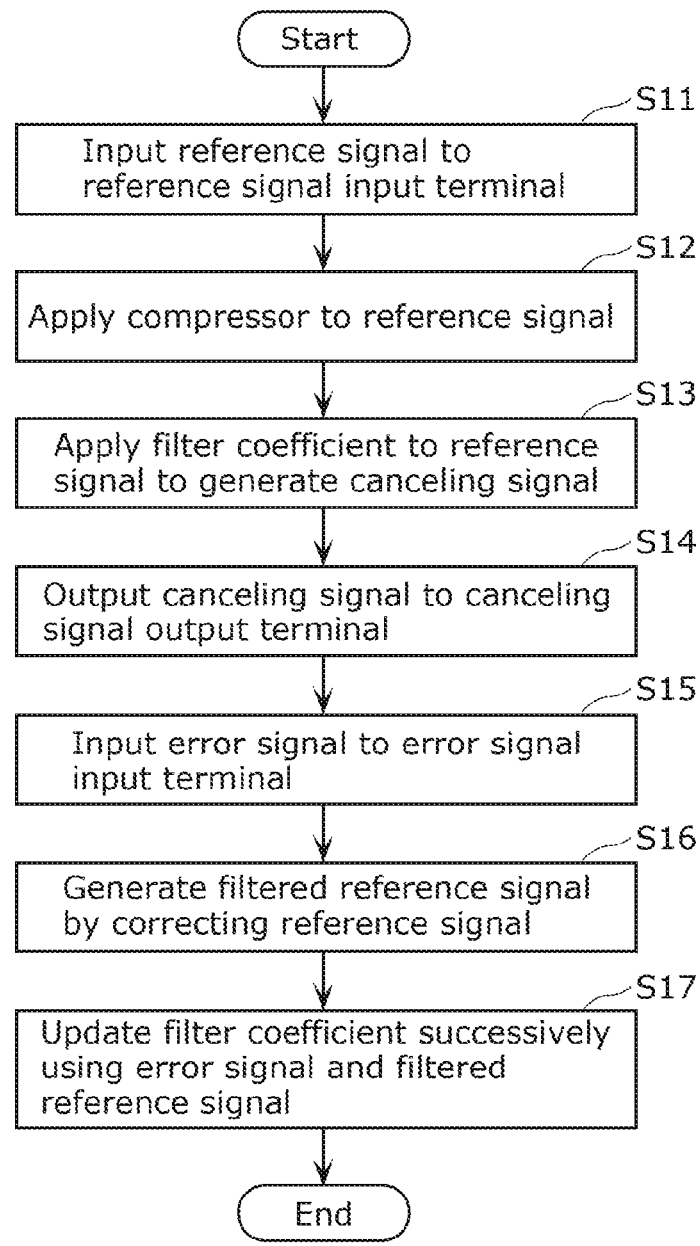
FIG. 3 is a flowchart of a basic operation of the active noise reduction device according to Embodiment 1.

As described above, active noise reduction device 10 performs noise reduction operation. First, a basic operation of active noise reduction device 10 will be described with reference to FIG. 3 in addition to FIG. 2. FIG. 3 is a flowchart of a basic operation of active noise reduction device 10.

First, a reference signal having a correlation with noise N0 is inputted from reference signal source 51 to reference signal input terminal 11 (S11). Reference signal input terminal 11 is an example of a reference signal input and is a terminal made of metal, for example.

Figure 4:
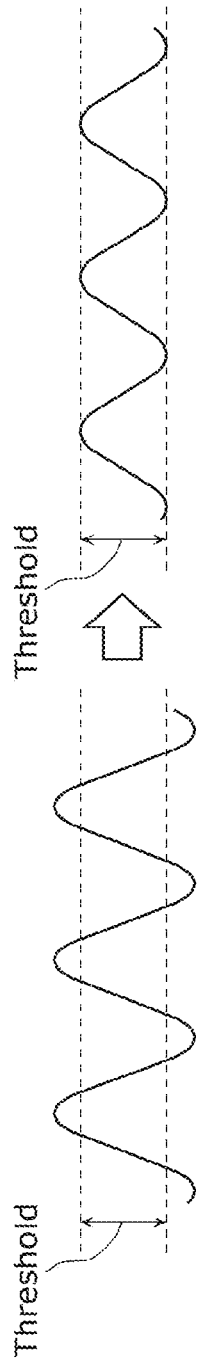
FIG. 4 is a diagram illustrating signal processing performed by a compressor when the amplitude of a reference signal is greater than or equal to a threshold.

The reference signal inputted to reference signal input terminal 11 is outputted via compressor 14 to adaptive filter unit 15 and simulated acoustic transfer characteristics filter unit 16. In other words, compressor 14 is applied to the reference signal (S12). Compressor 14 performs signal processing of compressing the amplitude of the reference signal to suppress clipping of the reference signal (i.e., the peak portion of the reference signal is clipped and the waveform changes) when the amplitude of the reference signal is greater than expected. FIG. 4 is a diagram illustrating signal processing performed by compressor 14.

Figure 5:
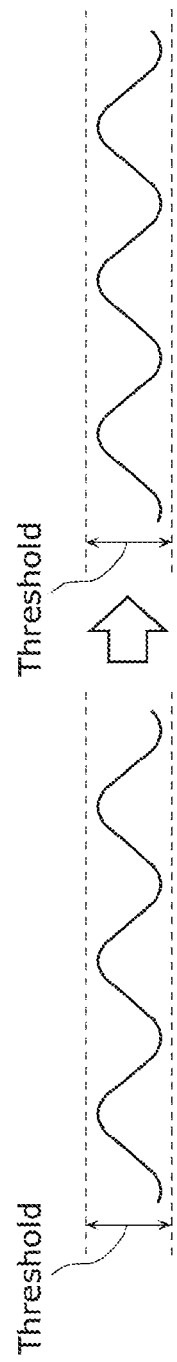
FIG. 5 is a diagram illustrating signal processing performed by the compressor when the amplitude of a reference signal is less than the threshold.

As illustrated in FIG. 4, compressor 14 compresses the amplitude of a reference signal inputted to reference signal input terminal 11 and having an amplitude greater than or equal to a threshold, and outputs the compressed reference signal. In other words, compressor 14 reduces the amplitude of a reference signal that is greater than or equal to the threshold to an amplitude approximately corresponding to the threshold, and outputs the compressed reference signal. The waveform of the reference signal remains substantially the same as the waveform of the reference signal that is not yet compressed. Moreover, as illustrated in FIG. 5, compressor 14 outputs, as it is, a reference signal inputted to reference signal input terminal 11 and having an amplitude less than the threshold.

Next, adaptive filter unit 15 applies an adaptive filter to the reference signal outputted from compressor 14 (multiplying the reference signal outputted from compressor 14 using an adaptive filter) to generate a canceling signal (S13). Adaptive filter unit 15 is implemented by what is called a finite impulse response (FIR) filter or an infinite impulse response (IIR) filter. Adaptive filter unit 15 outputs the generated canceling signal to canceling signal output terminal 12. The canceling signal is used to output canceling sound N1 for reducing noise N0 and is outputted to canceling signal output terminal 12 (S14).

Canceling signal output terminal 12 is an example of a canceling signal output, and is a terminal made of metal, for example. Canceling signal output terminal 12 receives a canceling signal generated by adaptive filter unit 15.

Canceling sound source 52 is connected to canceling signal output terminal 12. Therefore, a canceling signal is outputted to canceling sound source 52 via canceling signal output terminal 12. Canceling sound source 52 outputs canceling sound N1 based on the canceling signal.

Error signal source 53 detects a residual sound resulting from interference between canceling sound N1 and noise N0 generated from canceling sound source 52 corresponding to the canceling signal and outputs an error signal corresponding to the residual sound. As a result, the error signal is inputted to error signal input terminal 13 (S15). Error signal input terminal 13 is an example of an error signal input, and is a terminal made of metal, for example.

Next, simulated acoustic transfer characteristics filter unit 16 generates a filtered reference signal by correcting a reference signal using simulated transfer characteristics that simulate the acoustic transfer characteristics from canceling signal output terminal 12 to error signal input terminal 13 (S16). In other words, the simulated transfer characteristics simulate acoustic transfer characteristics from the position of canceling sound source 52 to the position of error signal source 53. For example, the simulated transfer characteristics are measured in space 55 and stored in storage 18 in advance. Note that the simulated transfer characteristics may be determined by an algorithm that uses no predetermined value.

Storage 18 is a storage device that stores the simulated transfer characteristics. Storage 18 also stores a coefficient of an adaptive filter, which will be described later. Specifically, storage 18 is implemented by semiconductor memory, for example. Note that when compressor 14, adaptive filter unit 15, simulated acoustic transfer characteristics filter unit 16, and filter coefficient updater 17 are implemented by a processor, such as a DSP, a control program to be executed by the processor is also stored in storage 18. Storage 18 may also store other parameters to be used for signal processing performed by compressor 14, adaptive filter unit 15, simulated acoustic transfer characteristics filter unit 16, and filter coefficient updater 17.

Filter coefficient updater 17 sequentially updates coefficient W of an adaptive filter based on the error signal and the generated filtered reference signal (S17).

Specifically, filter coefficient updater 17 uses a least mean square (LMS) method to calculate coefficient W of the adaptive filter to minimize the sum of squares of the error signal, and outputs the calculated coefficient of the adaptive filter to adaptive filter unit 15. Moreover, filter coefficient updater 17 sequentially updates the coefficient of the adaptive filter. Coefficient W of the adaptive filter is expressed as Expression 1 below, where "e" denotes a vector of the error signal and "R" denotes a vector of the filtered reference signal. Note that n is a natural number and represents an n-th sample in sampling period Ts. Here, μ is a scalar quantity and is a step size parameter that determines an amount of updating coefficient W of the adaptive filter per sampling.

[Math. 1]

$$W(n+1)=W(n)-\mu \cdot e(n) \cdot R(n) \quad \text{(Expression 1)}$$

Note that filter coefficient updater 17 may update coefficient W of the adaptive filter with a method other than the LMS method.

As described above, active noise reduction device 10 includes compressor 14. Compressor 14 makes it possible to output a reference signal having a maintained waveform to adaptive filter unit 15 and simulated acoustic transfer characteristics filter unit 16, even when the amplitude of the reference signal is larger than expected due to noise N0 that occurs unexpectedly, for example. In other words, even when the amplitude of the reference signal is extremely large, a signal having substantially the same frequency components as the reference signal is outputted to adaptive filter unit 15 and simulated acoustic transfer characteristics filter unit 16. Therefore, an appropriate canceling signal is outputted from adaptive filter unit 15. This prevents canceling sound from being perceived as an abnormal sound.

[Operation for Stopping Updating Coefficient of Adaptive Filter]

When compressor 14 is compressing the reference signal (the reference signal has an amplitude greater than or equal to the threshold), the reference signal is compressed to have a small amplitude and outputted to adaptive filter unit 15 and simulated acoustic transfer characteristics filter unit 16, even though noise N0 is large. Thus, the coefficient of the adaptive filter becomes large and the gain increases (i.e., the effect of the adaptive filter becomes strong). If the amplitude of the reference signal decreases when the coefficient of the adaptive filter is large, a large canceling sound N1 will be outputted because the effect of the adaptive filter remains strong even though noise N0 is small. This may cause an abnormal sound.

Figure 6:
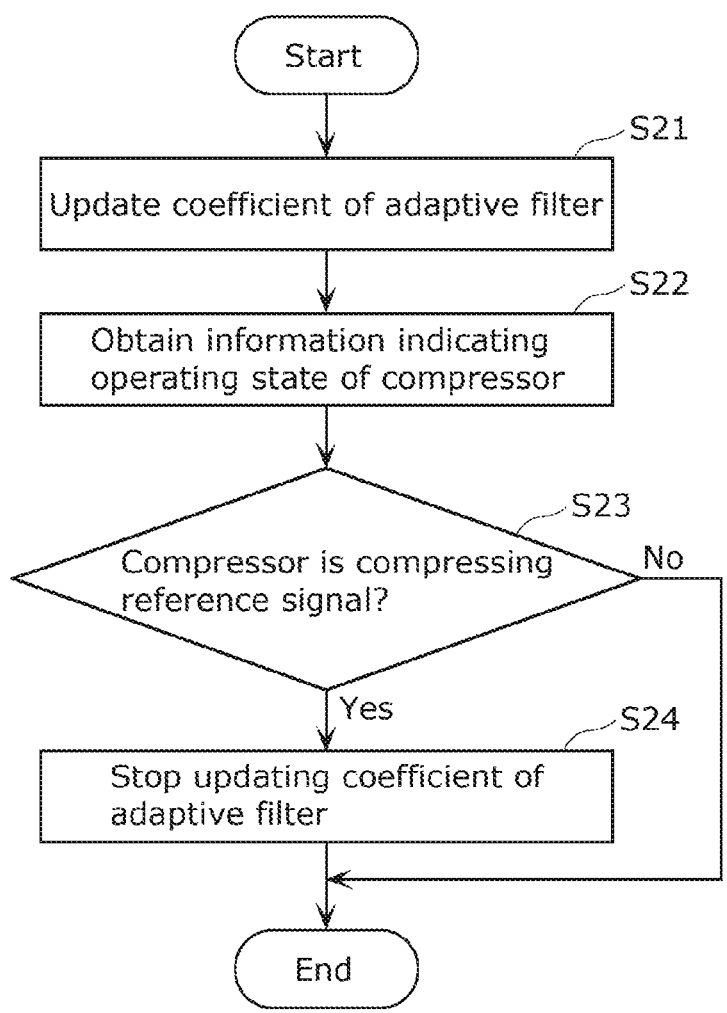
FIG. 6 is a flowchart of an operation of stopping update of a coefficient of an adaptive filter while the compressor outputs a compressed reference signal.

The amplitude of the reference signal often becomes greater than or equal to the threshold when a large noise N0 is generated unexpectedly. It is considered that such a state does not usually last for a long time. Therefore, filter coefficient updater 17 may stop updating the coefficient of the adaptive filter while compressor 14 outputs a compressed reference signal. FIG. 6 is a flowchart of such an operation of stopping update of the coefficient of the adaptive filter.

First, when filter coefficient updater 17 updates the coefficient of the adaptive filter (S21), filter coefficient updater 17 obtains information indicating an operating status of compressor 14 from compressor 14 (S22). The path for obtaining this information is indicated by the dashed arrow in FIG. 2. Next, based on the obtained information, filter coefficient updater 17 determines whether compressor 14 is compressing the reference signal (S23). Note that filter coefficient updater 17 may monitor the amplitude of the reference signal inputted to reference signal input terminal 11 and compare the amplitude with the threshold to perform the same determination as in step S23.

When filter coefficient updater 17 determines that compressor 14 is compressing the reference signal (Yes in S23), filter coefficient updater 17 stops updating the coefficient of the adaptive filter (S24). Specifically, filter coefficient updater 17 sets the step size parameter μ=0 in Expression 1 above, and outputs the same coefficient of the adaptive filter to adaptive filter unit 15. Stopping updating of the coefficient of the adaptive filter can also be implemented by setting W(n+1)=W(n) and not rewriting W. When filter coefficient updater 17 determines that compressor 14 is not compressing the reference signal (No in S23), filter coefficient updater 17 continues updating the coefficient of the adaptive filter.

As described above, filter coefficient updater 17 stops updating the coefficient of the adaptive filter while compressor 14 outputs a compressed reference signal. This prevents a large canceling sound N1 from being output and being perceived as an abnormal sound, when the amplitude of the reference signal returns to an amplitude less than the threshold.

Embodiment 2

[Configuration of Active Noise Reduction Device According to Embodiment 2]

Figure 7:
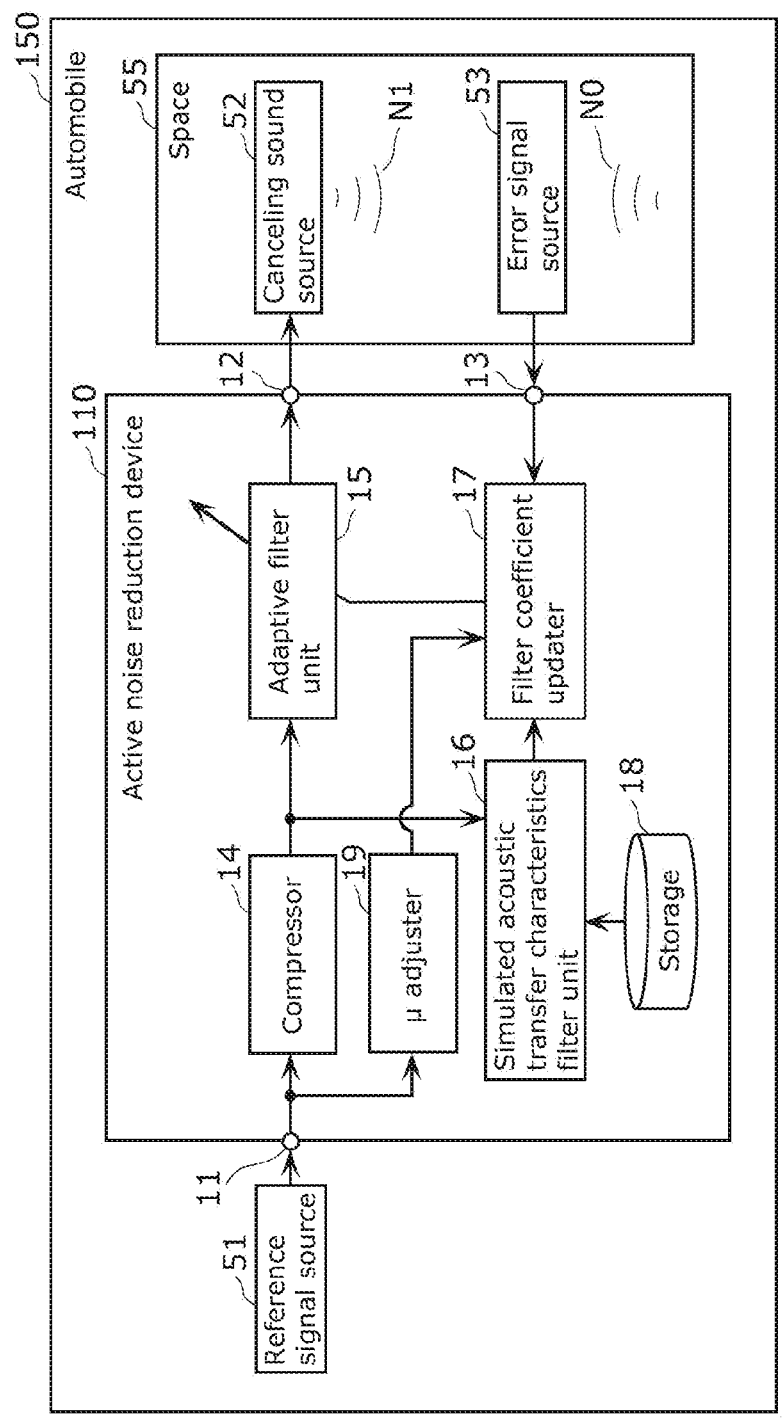
FIG. 7 is a block diagram illustrating a functional configuration of the active noise reduction device according to Embodiment 2.

Hereinafter, a functional configuration of an active noise reduction device according to Embodiment 2 will be described. FIG. 7 is a block diagram illustrating a functional configuration of the active noise reduction device according to Embodiment 2. Note that in the following Embodiment 2, detailed description of the matters that have been already described will be omitted.

As illustrated in FIG. 7, automobile 150 differs from automobile 50 in that automobile 150 includes active noise reduction device 110 instead of active noise reduction device 10. Active noise reduction device 110 differs from active noise reduction device 10 in that active noise reduction device 110 includes μ adjuster 19.

Here, μ adjuster 19 adjusts step size parameter μ in Expression 1 above and causes filter coefficient updater 17 to use the step size parameter μ that has been adjusted. In other words, μ adjustment 19 instructs the value of the step size parameter μ to the filter coefficient updater.

When the value of step size parameter µ is too large, the adaptive filter is more likely to diverge. When the value of step size parameter µ is too small, the coefficient of the adaptive filter of filter coefficient updater 17 will not be updated in time, and the effect of reducing noise will be reduced. Accordingly, for example, µ adjuster 19 sets step size parameter µ to a smaller value as the amplitude of the reference signal increases.

Specifically, µ adjuster 19 sets step size parameter µ to a value proportional to a reciprocal of a mean value of the amplitude of the reference signal in the latest predetermined period. Here, step size parameter µ is not 0. In addition, µ adjuster 19 may set step size parameter µ to a value proportional to a reciprocal of a mean square value of the amplitude of the reference signal in the latest predetermined period (i.e., a square of rms of the reference signal in the latest predetermined period). This makes it possible to experimentally and empirically verify that step size parameter µ can be adjusted appropriately.

In such a case, when step size parameter µ is adjusted using a reference signal outputted from compressor 14, the reference signal outputted from compressor 14 is sometimes compressed and therefore the value of step size parameter µ may not be adjusted appropriately.

Therefore, in active noise reduction device 110, µ adjuster 19 adjusts step size parameter µ using a reference signal before being inputted to compressor 14 (i.e., reference signal inputted to reference signal input terminal 11).

Such active noise reduction device 110 includes compressor 14 and can adjust step size parameter µ appropriately even when a compressed reference signal is outputted from compressor 14. Therefore, active noise reduction device 110 can improve a noise reduction effect even when a compressed reference signal is being outputted from compressor 14.

Note that the use of the reciprocal of the mean square value of the amplitude of the reference signal for step size parameter µ as described above is to normalize each level of e and R of −µeR, assuming that the level of the reference signal is approximately proportional to the level of the error signal. Therefore, in cases where active noise reduction device 110 includes compressor 24 that compresses an error signal as in Embodiment 3, which will be described later, it is more appropriate to adjust step size parameter µ using the reference signal outputted from compressor 14.

Variation of Embodiment 2

Figure 8:
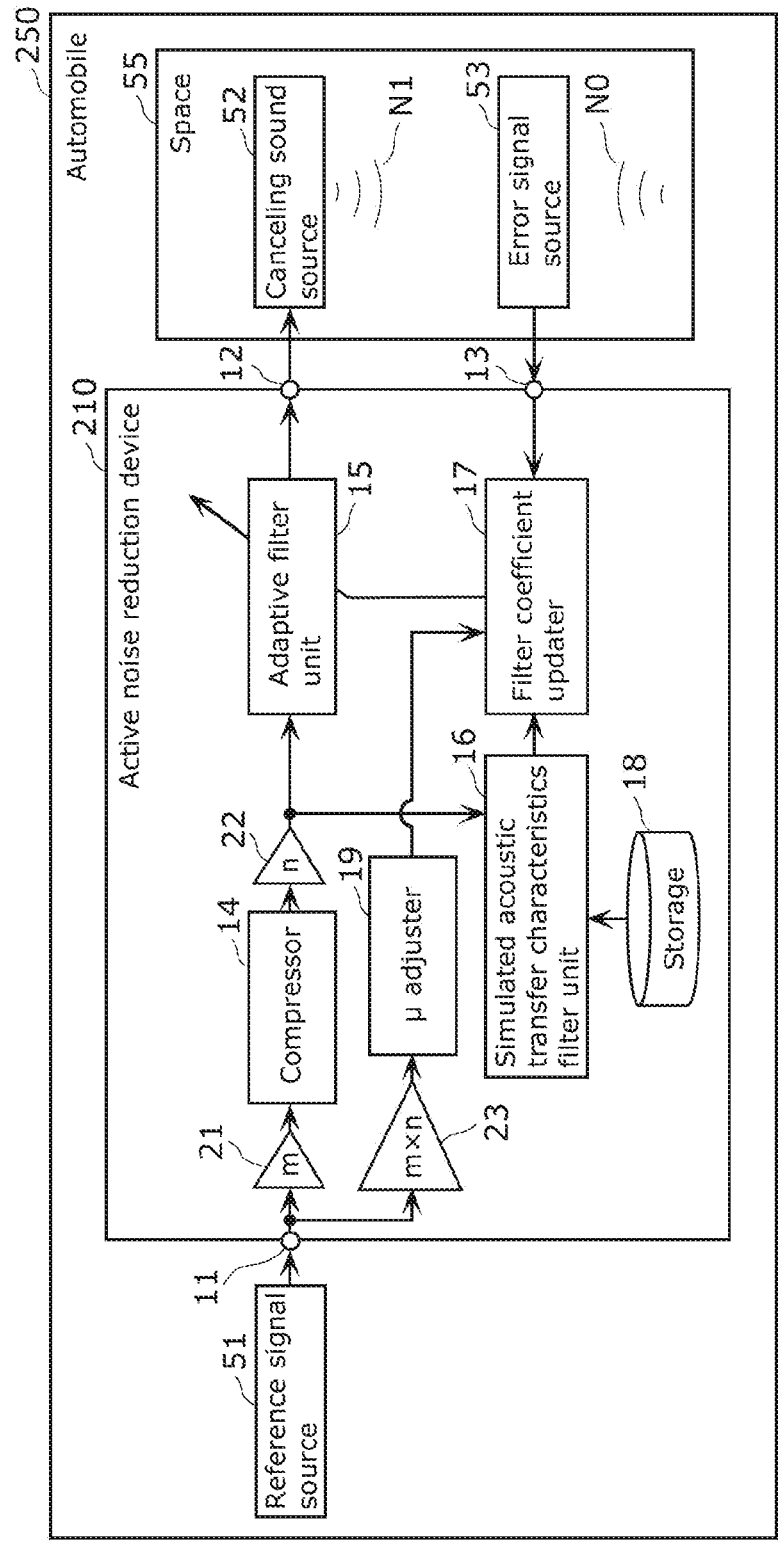
FIG. 8 is a block diagram of a functional configuration of an active noise reduction device according to a variation of Embodiment 2.

Compressor 14 is implemented by executing software (control program) by a processor, such as a DSP, for example. When a user actually drives automobile 150 and sets the relation between the threshold of compressor 14 and the amplitude of the reference signal, changing the design to amplify (or attenuate) the reference signal in a preceding stage and a following stage of compressor 14 may be easier than changing the threshold itself. Specifically, such a case is when the user wishes to implement compressor 14 using existing software as it is. Therefore, a gain adjuster may be provided in a preceding stage and a following stage of compressor 14. FIG. 8 is a block diagram illustrating a functional configuration of an active noise reduction device according to a variation of Embodiment 2.

As illustrated in FIG. 8, automobile 250 differs from automobile 150 in that automobile 250 includes active noise reduction device 210 instead of active noise reduction device 110. Active noise reduction device 210 differs from active noise reduction device 110 in that active noise reduction device 210 includes first gain adjuster 21, second gain adjuster 22, and third gain adjuster 23.

First gain adjuster 21 multiplies the reference signal input to reference signal input terminal 11 by m, and outputs the multiplied reference signal to compressor 14. Here, m is a positive number and may be greater than or equal to 1, or less than 1. For example, first gain adjuster 21 is implemented by hardware such as an amplifier circuit, but may be implemented by software.

Second gain adjuster 22 multiplies the reference signal outputted from compressor 14 by n (n: a positive number) and outputs the multiplied reference signal to adaptive filter unit 15. Here, n is a positive number, and may be greater than or equal to 1, or less than 1. For example, second gain adjuster 22 is implemented by hardware, such as an amplifier circuit, but may be implemented by software.

Such first gain adjuster 21 and second gain adjuster 22 enable a user to easily set the relation between the threshold of compressor 14 and the amplitude of the reference signal.

With first gain adjuster 21 and second gain adjuster 22, the reference signal is multiplied by m×n and outputted to adaptive filter unit 15. In this case, active noise reduction device 210 includes third gain adjuster 23 so that µ adjuster 19 can appropriately adjust step size parameter µ.

Third gain adjuster 23 multiplies the reference signal before being inputted to first gain adjuster 21 by m×n, and outputs the multiplied reference signal. Third gain adjuster 23 is implemented by, for example, hardware such as an amplifier circuit, but may be implemented by software. Here, µ adjuster 19 adjusts step size parameter µ using the reference signal outputted from third gain adjuster 23. Accordingly, µ adjuster 19 can appropriately adjust step size parameter µ.

Embodiment 3

[Configuration of Active Noise Reduction Device According to Embodiment 3]

Figure 9:
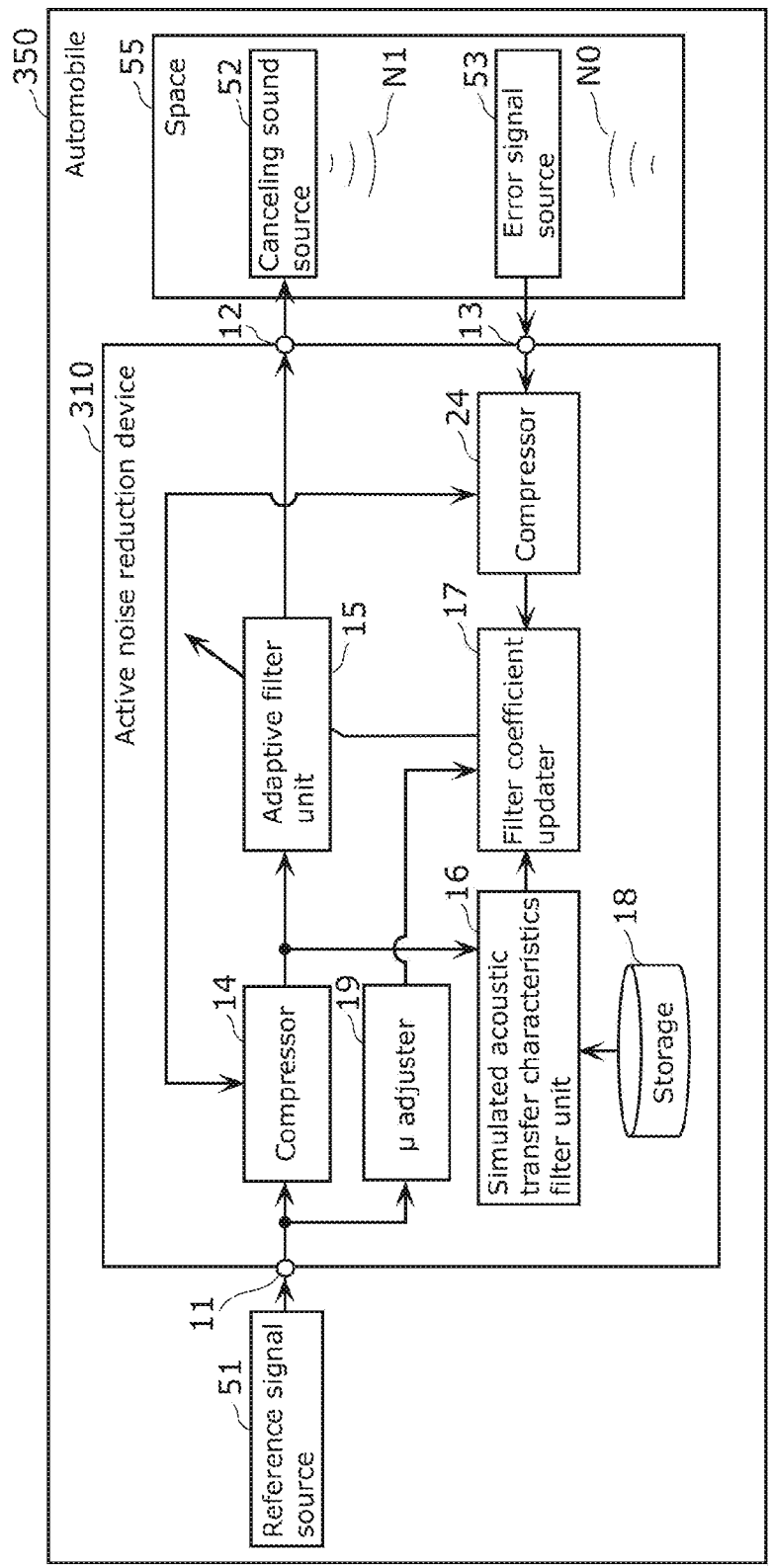
FIG. 9 is a block diagram illustrating a functional configuration of the active noise reduction device according to Embodiment 3.

Hereinafter, a functional configuration of an active noise reduction device according to Embodiment 3 will be described. FIG. 9 is a block diagram illustrating a functional configuration of the active noise reduction device according to Embodiment 3. Note that in Embodiment 3, detailed description of the matters that have been already described will be omitted.

As illustrated in FIG. 9, automobile 350 differs from automobile 50 in that automobile 350 includes active noise reduction device 310 instead of active noise reduction device 10. Active noise reduction device 310 has a configuration in which compressor 24 is added to active noise reduction device 210.

Compressor 24 compresses and outputs an error signal inputted to an error signal input and having an amplitude greater than or equal to the threshold. For example, compressor 24 is implemented by executing software (control program) by a processor, such as a DSP. The threshold of compressor 24 is usually different from the threshold of compressor 14, but may be the same threshold as compressor 14.

Compressor 24 operates in conjunction with compressor 14. Specifically, while compressor 24 compresses an error signal, compressor 24 notifies compressor 14 of the compression ratio of the error signal. While compressor 14 is notified of the compression ratio of the error signal, compressor 14 compresses a reference signal at a same compression ratio as compressor 24, even when the amplitude of the reference signal is less than the threshold. Similarly, while compressor 14 compresses a reference signal, compressor 14 notifies compressor 24 of the compression ratio of the reference signal. While compressor 24 is notified of the compression ratio of the reference signal, compressor 24 compresses the reference signal at the same compression ratio as compressor 14, even when the amplitude of the error signal is less than the threshold. The term "same" here means substantially the same, not strictly meaning being the same. Note that compressor 24 may operate in conjunction with compressor 14, regardless of whether the amplitude of the error signal is greater than or equal to the threshold. In other words, a configuration is possible in which no threshold is set for compressor 24, and compressor 24 operates using the same compression ratio as compressor 14 when compressor 14 is operating, and compressor 24 does not operate when compressor 14 is not operating.

In this way, if one of the reference signal and the error signal is compressed, the other of the reference signal and the error signal is also compressed. Accordingly, the coefficient of the adaptive filter has a magnitude as expected. Therefore, active noise reduction device 310 can prevent a large canceling sound N1 from being output and being perceived as an abnormal sound, when the amplitude of the reference signal returns to an amplitude less than the threshold.

Moreover, there may be cases where a reference signal greater than or equal to the threshold is inputted to compressor 14, and an error signal greater than or equal to the threshold is inputted to compressor 24 (i.e., both compressor 14 and compressor 24 need to compress the signals). In such cases, compressor 14 and compressor 24 notify each other of their compression ratios, and compressor 14 and compressor 24 each use a higher one of the compression ratio of compressor 14 and the compression ratio of compressor 24. A higher compression ratio here means that the ratio of the amplitude of the compressed signal becomes smaller (i.e., highly compressed).

For example, when (i) compressor 14 receives a reference signal having an amplitude that is to be compressed at a first compression ratio and (ii) compressor 24 receives an error signal having an amplitude that is to be compressed at a third compression ratio, the compression ratio of compressor 14 and the compression ratio of compressor 24 are each the same as a higher one of the first compression ratio and the third compression ratio. The term "same" here means substantially the same, not strictly meaning being the same.

In this way, when the same compression ratio is used for the reference signal and the error signal, the coefficient of the adaptive filter has a magnitude as expected. Therefore, active noise reduction device 310 can prevent a large canceling sound N1 from being output and being perceived as an abnormal sound, when the amplitude of the reference signal returns to an amplitude less than the threshold.

Note that active noise reduction device 310 may further include first gain adjuster 21, second gain adjuster 22, and third gain adjuster 23, as with active noise reduction device 210.

Embodiment 4

[Configuration of Active Noise Reduction Device According to Embodiment 4]

Figure 10:
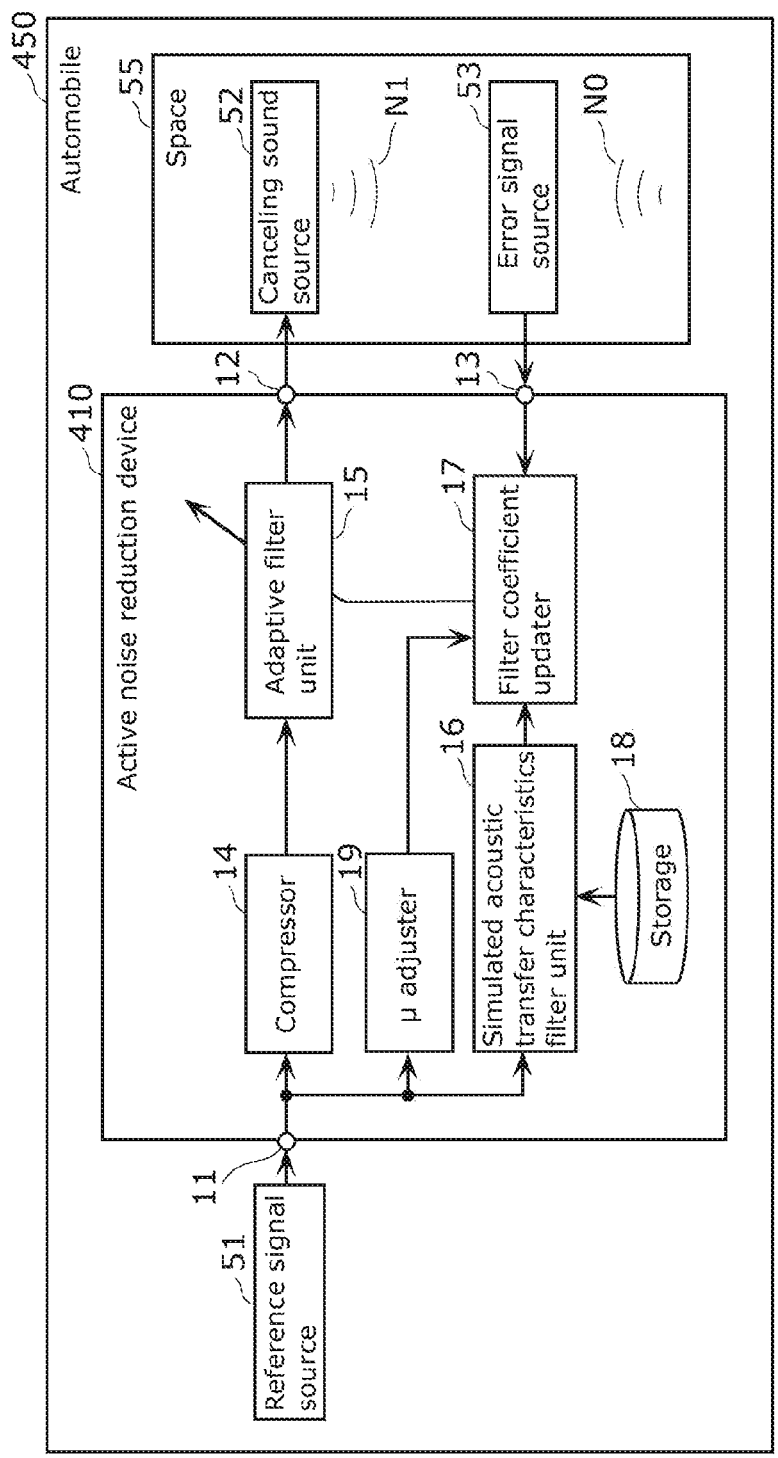
FIG. 10 is a block diagram illustrating a functional configuration of the active noise reduction device according to Embodiment 4.

Hereinafter, a functional configuration of an active noise reduction device according to Embodiment 4 will be described. FIG. 10 is a block diagram illustrating a functional configuration of the active noise reduction device according to Embodiment 4. Note that in Embodiment 4, detailed description of the matters that have been already described will be omitted.

As illustrated in FIG. 10, automobile 450 differs from automobile 50 in that automobile 450 includes active noise reduction device 410 instead of active noise reduction device 10.

Active noise reduction device 410 has a configuration similar to the configuration of active noise reduction device 210. Here, in active noise reduction device 210, simulated acoustic transfer characteristics filter unit 16 generates a filtered reference signal by correcting a reference signal outputted from compressor 14 using simulated acoustic transfer characteristics. In contrast, in active noise reduction device 410, simulated acoustic transfer characteristics filter unit 16 generates a filtered reference signal by correcting a reference signal received by reference signal input terminal 11 and before being inputted to compressor 14, using simulated acoustic transfer characteristics.

If an unexpected phenomenon is a case where a large canceling sound N1 is outputted and perceived as an abnormal sound, the time period in which the coefficient of the adaptive filter is to be updated due to this phenomenon is considered to be short. Therefore, active noise reduction device 410 uses a reference signal that does not go through compressor 14 to update the filter coefficient, while an abnormal sound is suppressed by compressor 14. Accordingly, since the coefficient of the adaptive filter will have a magnitude as expected, this prevents a large canceling sound N1 from being output and perceived as an abnormal sound, when the amplitude of the reference signal returns to an amplitude less than the threshold.

Note that active noise reduction device 410 may further include first gain adjuster 21, second gain adjuster 22, and third gain adjuster 23, as with active noise reduction device 210. Moreover, active noise reduction device 410 may also include compressor 24 for compressing an error signal, as with active noise reduction device 310.

Embodiment 5

[Configuration of Active Noise Reduction Device According to Embodiment 5]

Figure 11:
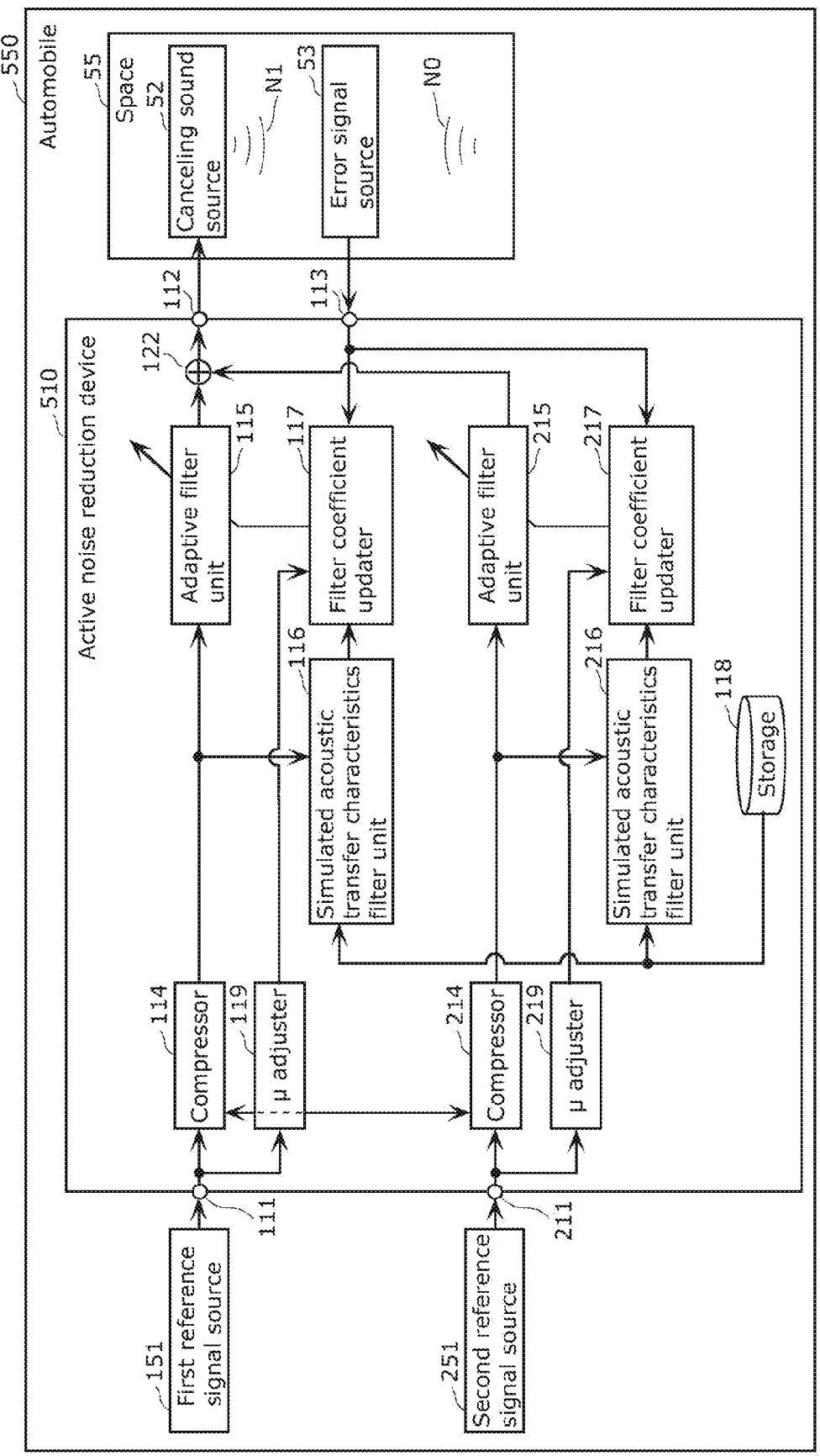
FIG. 11 is a block diagram illustrating a functional configuration of the active noise reduction device according to Embodiment 5.

Hereinafter, a functional configuration of an active noise reduction device according to Embodiment 5 will be described. FIG. 11 is a block diagram illustrating a functional configuration of the active noise reduction device according to Embodiment 5. Note that in Embodiment 5, detailed description of the matters that have been already described will be omitted.

As illustrated in FIG. 11, automobile 550 differs from automobile 50 in that automobile 550 includes active noise reduction device 510 instead of active noise reduction device 10.

Active noise reduction device 510 includes: first reference signal input terminal 111; second reference signal input terminal 211; canceling signal output terminal 112; error signal input terminal 113; compressor 114; adaptive filter unit 115; simulated acoustic transfer characteristics filter unit 116; filter coefficient updater 117; μ adjuster 119; compressor 214; adaptive filter unit 215; simulated acoustic transfer characteristics filter unit 216; filter coefficient updater 217; μ adjuster 219; storage 118; and adder 122.

First reference signal input terminal 111 is an example of a first reference signal input. A first reference signal outputted by first reference signal source 151 attached to automobile 550 is inputted to first reference signal input 111. First reference signal source 151 is specifically an acceleration sensor or a microphone, for example. First reference signal input terminal 111 is specifically a terminal made of metal, for example.

Second reference signal input terminal 211 is an example of a second reference signal input. A second reference signal outputted by second reference signal source 251 attached to automobile 550 is inputted to second reference signal input 211. Second reference signal source 121 is specifically an acceleration sensor or a microphone, for example. Second reference signal input terminal 211 is specifically a terminal made of metal, for example.

Compressor 114, adaptive filter unit 115, simulated acoustic transfer characteristics filter unit 116, filter coefficient updater 117, and µ adjuster 119 generate a canceling signal using the first reference signal inputted to first reference signal input terminal 111 and an error signal inputted to error signal input terminal 113. The functions and operations of these structural elements are respectively the same as the functions and operations of compressor 14, adaptive filter unit 15, simulated acoustic transfer characteristics filter unit 16, filter coefficient updater 17, and µ adjuster 19. Note that the simulated transfer characteristics to be used by simulated acoustic transfer characteristics filter unit 116 is stored in storage 118.

Compressor 214, adaptive filter unit 215, simulated acoustic transfer characteristics filter unit 216, filter coefficient updater 217, and µ adjuster 219 generate a canceling signal using the second reference signal inputted to second reference signal input terminal 211 and an error signal input to error signal input terminal 113. The functions and operations of these structural elements are respectively the same as the functions and operations of compressor 14, adaptive filter unit 15, simulated acoustic transfer characteristics filter unit 16, filter coefficient updater 17, and µ adjuster 19. Note that the simulated transfer characteristics to be used by simulated acoustic transfer characteristics filter unit 216 is stored in storage 118.

Adder 122 adds the canceling signal outputted from adaptive filter unit 115 and the canceling signal outputted from adaptive filter unit 215, and outputs the canceling signal obtained by adding the canceling signals to canceling signal output terminal 112. Adder 122 is implemented by, for example, a processor such as a DSP, but may be implemented by an adding circuit including a microcomputer or an operational amplifier.

In the above-described active noise reduction device 510, if only one of the first reference signal and the second reference signal is compressed by a compressor, the components of the first reference signal and the components of the second reference signal included in the canceling signal will be unbalanced, and the noise control effect may not be sufficiently achieved at a location away from error signal source 53.

In view of this, compressor 114 operates in conjunction with compressor 214 in active noise reduction device 510. Specifically, while compressor 114 compresses the first reference signal, compressor 114 notifies compressor 214 of the compression ratio of the first reference signal. While compressor 214 is notified of the compression ratio of the first reference signal, compressor 214 compresses the second reference signal at the same compression ratio as compressor 114, even when the amplitude of the second reference signal is less than the threshold. Similarly, while compressor 214 compresses the second reference signal, compressor 214 notifies compressor 114 of the compression ratio of the second reference signal. While compressor 114 is notified of the compression ratio of the second reference signal, compressor 114 compresses the first reference signal at the same compression ratio as compressor 214, even when the amplitude of the first reference signal is less than the threshold. The term "same" here means substantially the same, not strictly meaning being the same.

As described above, this prevents the components of the first reference signal and the components of the second reference signal included in the canceling signal from being unbalanced. Such unbalance may occur when one of the first reference signal and the second reference signal is compressed and a remaining one of the first reference signal and the second reference signal is also compressed, even though the remaining one of the reference signals need not be compressed. In other words, active noise reduction device 510 can prevent reduction in the noise reduction effect at a location away from error signal source 53.

Moreover, there may be cases where a first reference signal greater than or equal to the threshold is inputted to compressor 114, and a second reference signal greater than or equal to the threshold is inputted to compressor 214 (i.e., both compressor 114 and compressor 214 need to compress the reference signals). In such cases, compressor 114 and compressor 214 notify each other of their compression ratios, and compressor 114 and compressor 214 each use a higher one of the compression ratio of compressor 114 and the compression ratio of compressor 214. A higher compression ratio here means that the ratio of the amplitude of the compressed signal becomes smaller (i.e., highly compressed).

For example, when compressor 114 receives the first reference signal having an amplitude that is to be compressed at a first compression ratio and compressor 214 receives the second reference signal having an amplitude that is to be compressed at a second compression ratio, the compression ratio of compressor 114 and the compression ratio of compressor 214 are each the same as a higher one of the first compression ratio and the second compression ratio. The term "same" here means substantially the same, not strictly meaning being the same.

As described above, using the same compression ratio for the first reference signal and the second reference signal prevents the components of the first reference signal and the components of the second reference signal included in the canceling signal from being unbalanced. In other words, active noise reduction device 510 can prevent reduction in the noise reduction effect at a location away from error signal source 53.

Note that active noise reduction device 510 may further include a gain adjuster, as with active noise reduction device 210. Moreover, active noise reduction device 510 may also include a compressor for compressing an error signal, as with active noise reduction device 310. In active noise reduction device 510, simulated acoustic transfer characteristics filter unit 116 and simulated acoustic transfer characteristics filter unit 216 may each generate a filtered reference signal by correcting a reference signal inputted to the reference signal input terminal and before being inputted to the compressor, using the simulated acoustic transfer characteristics.

Effects, Etc.

As described above, active noise reduction device 110 is an active noise reduction device that reduces noise N0 in space 55 in automobile 50. Active noise reduction device 10 includes: reference signal input terminal 11 that receives a reference signal outputted by reference signal source 51 and having a correlation with noise N0, reference signal source 51 being attached to automobile 50; compressor 14 that compresses and outputs the reference signal received by reference signal input terminal 11 and having an amplitude greater than or equal to a first threshold; adaptive filter unit 15 that applies an adaptive filter to the reference signal outputted from compressor 14 to generate a canceling signal to be used to output canceling sound N1 for reducing noise N0; canceling signal output terminal 12 that receives the canceling signal generated; filter coefficient updater 17 that updates a coefficient of the adaptive filter using step size parameter μ; and μ adjuster 19 that adjusts step size parameter μ using the reference signal before being inputted to compressor 14. Automobile 50 is an example of a vehicle, reference signal input terminal 11 is an example of a first reference signal input, canceling signal output terminal 12 is an example of a canceling signal output, and compressor 14 is an example of a first compressor.

Since such active noise reduction device 110 includes compressor 14, a reference signal having a maintained waveform is outputted to adaptive filter unit 15, even when the amplitude of the reference signal is larger than expected due to noise N0 that has unexpectedly occurred, for example. In other words, even when the amplitude of the reference signal is extremely large, a signal having substantially the same frequency components as the reference signal is outputted to adaptive filter unit 15. Therefore, active noise reduction device 10 can output an appropriate canceling signal from adaptive filter unit 15. Consequently, this prevents canceling sound N1 from being perceived as an abnormal sound.

Moreover, active noise reduction device 110 includes compressor 14 and can adjust step size parameter μ appropriately even when a compressed reference signal is outputted from compressor 14. Therefore, active noise reduction device 110 can improve the noise reduction effect when a compressed reference signal is output from compressor 14.

Moreover, in Embodiment 5, active noise reduction device 510 includes: second reference signal input terminal 211 that receives a second reference signal outputted by second reference signal source 251 and having a correlation with noise N0, second reference signal source 251 being attached to automobile 550; and compressor 214 that compresses and outputs the second reference signal received by second reference signal input terminal 211 and having an amplitude greater than or equal to a second threshold. Compressor 114 included in active noise reduction device 510 is another example of the first compressor, and second reference signal input terminal 211 is an example of the second reference signal input. While compressor 214 compresses and outputs the second reference signal having an amplitude greater than or equal to the second threshold, compressor 114 compresses and outputs the first reference signal having an amplitude less than the first threshold at a same compression ratio as compressor 214. While compressor 114 compresses and outputs the first reference signal having an amplitude greater than or equal to the first threshold, compressor 214 compresses and outputs the second reference signal having an amplitude less than the second threshold at a same compression ratio as compressor 114.

Such active noise reduction device 510 can prevent that the components of the first reference signal and the components of the second reference signal included in the canceling signal from being unbalanced. In other words, active noise reduction device 510 can prevent reduction in the noise control effect at a location away from error signal source 53.

Moreover, in active noise reduction device 510, when (i) compressor 114 receives the first reference signal having an amplitude greater than or equal to the first threshold that is to be compressed at a first compression ratio and (ii) compressor 214 receives the second reference signal having an amplitude greater than or equal to the second threshold that is to be compressed at a second compression ratio, a compression ratio of compressor 114 and a compression ratio of compressor 214 are each same as a higher one of the first compression ratio and the second compression ratio.

Such active noise reduction device 510 can prevent the components of the first reference signal and the components of the second reference signal included in the canceling signal from being unbalanced. In other words, active noise reduction device 510 can suppress reduction in the noise control effect at a location away from error signal source 53.

Moreover, in Embodiment 3, active noise reduction device 310 includes: error signal input terminal 13 that receives an error signal corresponding to a residual sound resulting from interference between canceling sound N1 and noise N0; compressor 24 that compresses and outputs the error signal received by error signal input terminal 13 and having an amplitude greater than or equal to a third threshold; and simulated acoustic transfer characteristics filter unit 16 that generates a filtered reference signal by correcting the reference signal using simulated transfer characteristics that simulate acoustic transfer characteristics from canceling signal output terminal 12 to error signal input terminal 13. Filter coefficient updater 17 updates the coefficient of the adaptive filter using step size parameter μ, the error signal outputted from compressor 24, and the filtered reference signal. Error signal input terminal 13 is an example of an error signal input, and compressor 24 is an example of a third compressor.

Such active noise reduction device 310 can compress the error signal in addition to the reference signal.

Moreover, in active noise reduction device 310, while compressor 24 compresses and outputs the error signal having an amplitude greater than or equal to the third threshold, compressor 14 compresses and outputs the first reference signal having an amplitude less than the first threshold at a same compression ratio as compressor 24. While compressor 14 compresses and outputs the first reference signal having an amplitude greater than or equal to the first threshold, compressor 24 compresses and outputs the error signal having an amplitude less than the third threshold at a same compression ratio as compressor 14.

Such active noise reduction device 310 can prevent a large canceling sound N1 from being outputted and being perceived as an abnormal sound, when the amplitude of the reference signal returns to an amplitude less than the threshold.

Moreover, in active noise reduction device 310, when (i) compressor 14 receives the first reference signal having an amplitude greater than or equal to the first threshold that is to be compressed at a first compression ratio and (ii) compressor 24 receives the error signal having an amplitude greater than or equal to the third threshold that is to be compressed at the third compression ratio, a compression ratio of compressor 14 and a compression ratio of compressor 24 are each same as a higher one of the first compression ratio and the third compression ratio.

Such active noise reduction device 310 can prevent a large canceling sound N1 from being outputted and perceived as an abnormal sound, when the amplitude of the reference signal returns to an amplitude less than the threshold.

Moreover, in active noise reduction device 310, compressor 24 may compress and output the error signal received by the error signal input at a same compression ratio as compressor 14 regardless of an amplitude of the error signal, while compressor 14 compresses the first reference signal.

Such active noise reduction device 310 can prevent a large canceling sound N1 from being outputted and perceived as an abnormal sound, when the amplitude of the reference signal returns to an amplitude less than the threshold.

Moreover, in Embodiment 4, active noise reduction device 410 further includes error signal input terminal 13 that receives an error signal corresponding to a residual sound resulting from interference between canceling sound N1 and noise N0; simulated acoustic transfer characteristics filter unit 16 that generates a filtered reference signal by correcting the reference signal received by reference signal input terminal 11 and before being inputted to compressor 14, using simulated transfer characteristics that simulate acoustic transfer characteristics from canceling signal output terminal 12 to error signal input terminal 13. Filter coefficient updater 17 updates the coefficient of the adaptive filter using step size parameter μ, the error signal, and the filtered reference signal.

Such active noise reduction device 410 can prevent a large canceling sound N1 from being outputted and perceived as an abnormal sound, when the amplitude of the reference signal returns to an amplitude less than the threshold.

Moreover, for example, μ adjuster 19 sets step size parameter μ to a value proportional to a reciprocal of a mean square value of an amplitude of the reference signal in a predetermined period, the reference signal being a reference signal before being inputted to compressor 14.

Such μ adjuster 19 can adjust step size parameter μ appropriately.

Moreover, for example, while compressor 14 outputs the first reference signal compressed, filter coefficient updater 17 stops updating the coefficient of the adaptive filter.

Such active noise reduction device 10, etc. can prevent a large canceling sound N1 from being outputted and perceived as an abnormal sound, when the amplitude of the reference signal returns to an amplitude less than the threshold.

Moreover, an active noise reduction method to be executed by a computer, such as active noise reduction device 10, is an active noise reduction method of reducing noise in space 55 in automobile 50. The active noise reduction method includes: compressing and outputting a reference signal outputted by reference signal source 51, having a correlation with noise N0, and having an amplitude greater than or equal to a first threshold, reference signal source 51 being attached to automobile 50; applying an adaptive filter to the reference signal outputted in the compressing and outputting of the first reference signal to generate a canceling signal to be used to output canceling sound N1 for reducing noise N0; updating a coefficient of the adaptive filter using step size parameter p; and adjusting step size parameter μ using the first reference signal before being compressed.

Such active noise reduction method can prevent a canceling sound from being outputted and perceived as an abnormal sound, as with active noise reduction device 110.

Other Embodiments

Embodiments 1 to 5 have been described above, but the present disclosure is not limited to Embodiments 1 to 5 described above.

For example, each of the active noise reduction devices according to Embodiments 1 to 5 may be mounted on a vehicle other than an automobile. For example, a vehicle may be an aircraft or a ship. Moreover, the present disclosure may be implemented as such a vehicle other than an automobile.

Moreover, the configurations of the active noise reduction devices according to Embodiments 1 to 5 are examples. For example, each active noise reduction device may include a structural element such as a digital-analog (D/A) converter, a filter, a power amplifier, or an analog-digital (A/D) converter.

Moreover, in Embodiments 1 to 5 described above, the reference signal input, the error signal input, and the canceling signal output have been described as mutually different terminals, but these may be a single terminal. For example, with use of a digital communication standard that can connect devices such as the reference signal source, the error signal source, and the canceling sound source in series, the reference signal input, the error signal input, and the canceling signal output can be implemented by a single terminal.

Moreover, the processing operations performed by the active noise reduction devices according to Embodiments 1 to 5 are examples. For example, part of the digital signal processing described in the above embodiments may be implemented by analog signal processing.

Moreover, for example, in Embodiments 1 to 5 described above, the processing performed by a particular processor may be performed by a different processor. Moreover, the order of a plurality of processing operations may be changed, and a plurality of processing operations may be performed in parallel.

In addition, in Embodiments 1 to 5 described above, each structural element may be implemented by executing an appropriate software program for the structural element. Each structural element may be implemented by a program execution unit, such as a CPU or a processor, reading and executing a software program recorded on a recording medium such as a hard disk or semiconductor memory.

Moreover, in Embodiments 1 to 5 described above, each structural element may be implemented by hardware. For example, each structural element may be a circuit (or integrated circuit). These circuits may constitute one circuit as a whole, or each circuit may be a separate circuit. Each of these circuits may be a general-purpose circuit or a dedicated circuit.

Moreover, each structural element may be a circuit (or integrated circuit). These circuits may constitute one circuit as a whole, or each circuit may be a separate circuit. Each of these circuits may be a general-purpose circuit or a dedicated circuit.

Moreover, the general or specific aspects of the present disclosure may be implemented by a system, a device, a method, an integrated circuit, a computer program, or a non-transitory computer-readable recording medium such as a CD-ROM. Moreover, the general or specific aspects of the present disclosure may be implemented by any combination of systems, devices, methods, integrated circuits, computer programs, and non-transitory computer-readable recording media.

For example, the present disclosure may be implemented as an active noise reduction method executed by an active noise reduction device (computer or DSP), or as a program for causing a computer or DSP to execute the above active noise reduction method. Moreover, the present disclosure may also be implemented as a vehicle (for example, an automobile) or a noise control system including the active noise reduction device according to one of the embodiments described above and a reference signal source.

Other embodiments implemented through various changes and modifications conceived by a person of ordinary skill in the art based on the above embodiments or through a combination of the structural elements in the above embodiments in any manner that does not depart from the scope of the present disclosure may be included in the scope in an aspect or aspects according to the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2019-208427 filed on Nov. 19, 2019 and PCT International Application No. PCT/JP2020/042162 filed on Nov. 11, 2020.

INDUSTRIAL APPLICABILITY

The active noise reduction devices according to the present disclosure are useful as devices capable of reducing noise in an automobile cabin, for example.

The invention claimed is:

1. An active noise reduction device that reduces noise in a space in a vehicle, the active noise reduction device comprising:
   a first reference signal input that receives a first reference signal outputted by a first reference signal source and having a correlation with the noise, the first reference signal source being attached to the vehicle;
   a first compressor that compresses and outputs the first reference signal received by the first reference signal input, as a compressed first reference signal, the compressed first reference signal having an amplitude greater than or equal to a first threshold;
   an adaptive filter unit that applies an adaptive filter to the compressed first reference signal to generate a canceling signal to be used to output a canceling sound for reducing the noise;
   a canceling signal output that receives the canceling signal generated by the adaptive filter unit;
   a filter coefficient updater that updates a coefficient of the adaptive filter using at least a step size parameter;
   a μ adjuster that adjusts the step size parameter using the first reference signal before being inputted to the first compressor;
   an error signal input that receives an error signal corresponding to a residual sound resulting from interference between the canceling sound and the noise;
   a second compressor that compresses and outputs the error signal received by the error signal input, as a compressed error signal, the compressed error signal having an amplitude greater than or equal to a second threshold; and
   a simulated acoustic transfer characteristics filter unit that generates a filtered reference signal by correcting at least one of the first reference signal and the compressed first reference signal using simulated transfer characteristics that simulate acoustic transfer characteristics from the canceling signal,
   wherein the filter coefficient updater updates the coefficient of the adaptive filter using the step size parameter, the compressed error signal outputted from the second compressor, and the filtered reference signal.

2. The active noise reduction device according to claim 1, further comprising:
   a second reference signal input that receives a second reference signal outputted by a second reference signal source and having a correlation with the noise, the second reference signal source being attached to the vehicle; and
   a third compressor that compresses and outputs the second reference signal received by the second reference signal input, as a compressed second reference signal, the compressed second reference signal having an amplitude greater than or equal to a third threshold,
   wherein the first compressor compresses the first reference signal at a same compression ratio as the third compressor, and
   the third compressor compresses the second reference signal having the amplitude less than the third threshold at the same compression ratio as the first compressor.

3. The active noise reduction device according to claim 1, further comprising:
   a second reference signal input that receives a second reference signal outputted by a second reference signal source and having a correlation with the noise, the second reference signal source being attached to the vehicle; and
   a third compressor that compresses and outputs the second reference signal received by the second reference signal input, as a compressed second reference signal, the compressed second reference signal having an amplitude greater than or equal to a third threshold,
   wherein when the first reference signal is to be compressed at a first compression ratio and the second reference signal is to be compressed at a second compression ratio, compression ratios of the first compressor and the third compressor are each same as a higher one of the first compression ratio and the second compression ratio.

4. The active noise reduction device according to claim 1, wherein the first compressor compresses the first reference signal at a same compression ratio as the second compressor, and
   the second compressor compresses the error signal having the amplitude less than the second threshold at the same compression ratio as the first compressor.

5. The active noise reduction device according to claim 1, wherein when the first reference signal is to be compressed at a first compression ratio and the error signal is to be compressed at a second compression ratio, compression ratios of the first compressor and the second compressor are each same as a higher one of the first compression ratio and the second compression ratio.

6. An active noise reduction device that reduces noise in a space in a vehicle, the active noise reduction device comprising:
   a first reference signal input that receives a first reference signal outputted by a first reference signal source and having a correlation with the noise, the first reference signal source being attached to the vehicle;

a first compressor that compresses and outputs the first reference signal received by the first reference signal input, as a compressed first reference signal, the compressed first reference signal having an amplitude greater than or equal to a first threshold;

an adaptive filter unit that applies an adaptive filter to the compressed first reference signal to generate a canceling signal to be used to output a canceling sound for reducing the noise;

a canceling signal output that receives the canceling signal generated by the adaptive filter unit;

a filter coefficient updater that updates a coefficient of the adaptive filter using at least a step size parameter;

a μ adjuster that adjusts the step size parameter using the first reference signal before being inputted to the first compressor;

an error signal input that receives an error signal corresponding to a residual sound resulting from interference between the canceling sound and the noise;

a second compressor that compresses and outputs the error signal received by the error signal input at a same compression ratio as the first compressor regardless of an amplitude of the error signal, while the first compressor compresses the first reference signal; and a simulated acoustic transfer characteristics filter unit that generates a filtered reference signal by correcting at least one of the first reference signal and the compressed first reference signal using simulated transfer characteristics that simulate acoustic transfer characteristics from the canceling signal output to the error signal input, wherein the filter coefficient updater updates the coefficient of the adaptive filter using the step size parameter, the error signal outputted from the second compressor, and the filtered reference signal.

7. The active noise reduction device according to claim 1, wherein the simulated acoustic transfer characteristics filter unit corrects the first reference signal received by the first reference signal input and before being inputted to the first compressor, using the simulated transfer characteristics.

8. The active noise reduction device according to claim 1, wherein the μ adjuster sets the step size parameter to a value proportional to a reciprocal of a mean square value of an amplitude of the first reference signal in a predetermined period, the first reference signal being a reference signal before being inputted to the first compressor.

9. The active noise reduction device according to claim 1, wherein while the first compressor outputs the compressed first reference signal, the filter coefficient updater stops updating the coefficient of the adaptive filter.

10. A vehicle comprising:
the active noise reduction device according to claim 1; and
the first reference signal source.

11. An active noise reduction method of reducing noise in a space in a vehicle, the active noise reduction method comprising:
compressing and outputting a first reference signal outputted by a first reference signal source, as a compressed first reference signal, the compressed first reference signal having a correlation with the noise, and having an amplitude greater than or equal to a first threshold, the first reference signal source being attached to the vehicle;

applying an adaptive filter to the compressed first reference signal to generate a canceling signal to be used to output a canceling sound for reducing the noise;

updating a coefficient of the adaptive filter using a step size parameter;

adjusting the step size parameter using the first reference signal before being compressed;

receiving an error signal corresponding to a residual sound resulting from interference between the canceling sound and the noise;

compressing and outputting the error signal, as a compressed error signal, the compressed error signal having an amplitude greater than or equal to a second threshold; and generating a filtered reference signal by correcting at least one of the first reference signal and the compressed first reference signal using simulated transfer characteristics that simulate acoustic transfer characteristics from the canceling signal, wherein, in the updating, the coefficient of the adaptive filter is updated using the step size parameter, the compressed error signal, and the filtered reference signal.

12. The active noise reduction method according to claim 11, further comprising:
receiving a second reference signal outputted by a second reference signal source and having a correlation with the noise, the second reference signal source being attached to the vehicle; and compressing and outputting the second reference signal, as a compressed second reference signal, the compressed second reference signal having an amplitude greater than or equal to a third threshold, wherein the first reference signal and the second reference signal are compressed at a same compression ratio.

13. The active noise reduction method according to claim 11, further comprising:
receiving a second reference signal outputted by a second reference signal source and having a correlation with the noise, the second reference signal source being attached to the vehicle; and compressing and outputting the second reference signal, as a compressed second reference signal, the compressed second reference signal having an amplitude greater than or equal to a third threshold, wherein when the first reference signal is to be compressed at a first compression ratio and the second reference signal is to be compressed at a second compression ratio, compression ratios of the first reference signal and the second reference signal are each same as a higher one of the first compression ratio and the second compression ratio.

14. The active noise reduction method according to claim 11,
wherein the first reference signal and the error signal are compressed at a same compression ratio.

15. The active noise reduction method according to claim 11,
wherein when the first reference signal is to be compressed at a first compression ratio and the error signal is to be compressed at a second compression ratio, compression ratios of the first reference signal and the error signal are each same as a higher one of the first compression ratio and the second compression ratio.

16. The active noise reduction method according to claim 11, wherein the filtered reference signal is generated by correcting the first reference signal, outputted by the first reference signal source and before being compressed in the compressing, using the simulated transfer characteristics.

17. The active noise reduction method according to claim 11,
wherein the step size parameter is adjusted to a value proportional to a reciprocal of a mean square value of an amplitude of the first reference signal in a predetermined period.

18. The active noise reduction method according to claim 11,
wherein, while the compressed first reference signal is being outputted, the updating of the coefficient of the adaptive filter is stopped.

* * * * *